United States Patent
Huang et al.

(10) Patent No.: US 11,228,037 B2
(45) Date of Patent: Jan. 18, 2022

(54) HIGH-PERFORMANCE ELECTRODES WITH A POLYMER NETWORK HAVING ELECTROACTIVE MATERIALS CHEMICALLY ATTACHED THERETO

(71) Applicant: GM Global Technology Operations LLC, Detroit, MI (US)

(72) Inventors: Xiaosong Huang, Novi, MI (US); Nicole Ellison, Madison Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 64 days.

(21) Appl. No.: 16/034,051

(22) Filed: Jul. 12, 2018

(65) Prior Publication Data
US 2020/0020948 A1    Jan. 16, 2020

(51) Int. Cl.
*H01M 4/62* (2006.01)
*H01M 4/04* (2006.01)
(Continued)

(52) U.S. Cl.
CPC ............. *H01M 4/622* (2013.01); *C08J 3/244* (2013.01); *H01M 4/0404* (2013.01);
(Continued)

(58) Field of Classification Search
CPC ........ H01M 4/02; H01M 4/04; H01M 4/0478; H01M 4/362; H01M 4/60; H01M 4/622;
(Continued)

(56) References Cited

U.S. PATENT DOCUMENTS 3,819,569 A    6/1974   Baird
5,891,593 A *  4/1999   Keller .................... H01M 4/13
                                                        429/217
(Continued)

FOREIGN PATENT DOCUMENTS

CN    101107746 A    1/2008
CN    101385163 A    3/2009
(Continued)

OTHER PUBLICATIONS

Zheng Long Xu et al.; "Electrospun Carbon Nanofiber Anodes Containing Monodispersed Si Nanoparticles and Graphene Oxide with Exceptional High Rate Capacities"; Nano Energy, vol. 6; May 2014; pp. 27-35.
(Continued)

*Primary Examiner* — Tabassom Tadayyon Eslami
(74) *Attorney, Agent, or Firm* — Quinn IP Law (57) ABSTRACT

High performance electrodes for electrochemical devices having a polymer network with an electroactive material chemically attached to a crosslinked polymer matrix are disclosed. A method includes mixing an electrode slurry and forming a polymer network within the electrode slurry. The electrode slurry includes an electroactive material, an electrically conductive filler, a plurality of polymer chains, and a plurality of chemical crosslinking precursors. Each chemically crosslinking precursor is configured to (i) chemically crosslink the plurality of polymer chains and (ii) chemically attach the electroactive material to the plurality of polymer chains.

20 Claims, 3 Drawing Sheets

(51) Int. Cl.
*H01M 10/0525* (2010.01)
*C08J 3/24* (2006.01)
*H01M 4/139* (2010.01)

(52) U.S. Cl.
CPC ....... *H01M 4/139* (2013.01); *H01M 10/0525* (2013.01); *C08J 2301/04* (2013.01); *C08J 2305/04* (2013.01); *C08J 2333/02* (2013.01)

(58) Field of Classification Search
CPC ......... H01M 2004/028; H01M 4/0404; H01M 4/139; C08J 3/244; C08J 3/24
USPC .................................................. 429/217, 218
See application file for complete search history.

(56) References Cited

U.S. PATENT DOCUMENTS

| | | |
|---|---|---|
| 6,451,487 B1 | 9/2002 | Besner et al. |
| 7,018,607 B2 | 3/2006 | Nazri et al. |
| 7,285,260 B2 | 10/2007 | Armand et al. |
| 7,457,018 B2 | 11/2008 | Armand et al. |
| 7,491,467 B2 | 2/2009 | Satoh et al. |
| 7,651,732 B2 | 1/2010 | Cheng et al. |
| 7,722,994 B2 | 5/2010 | Halalay |
| 7,736,805 B2 | 6/2010 | Nazri et al. |
| 8,076,027 B2 | 12/2011 | Honda et al. |
| 8,101,152 B1 | 1/2012 | Halalay et al. |
| 8,148,455 B2 | 4/2012 | Posudievsky et al. |
| 8,247,116 B2 | 8/2012 | He et al. |
| 8,309,644 B1 | 11/2012 | Huang |
| 8,399,138 B2 | 3/2013 | Timmons |
| 8,420,259 B2 | 4/2013 | Xiao et al. |
| 8,440,350 B1 | 5/2013 | Verbrugge et al. |
| 8,455,140 B1 | 6/2013 | Huang et al. |
| 8,460,591 B2 | 6/2013 | Huang et al. |
| 8,460,829 B1 | 6/2013 | Huang et al. |
| 8,470,468 B2 | 6/2013 | Xiao et al. |
| 8,470,898 B2 | 6/2013 | Huang |
| 8,641,860 B2 | 2/2014 | Flores et al. |
| 8,642,201 B2 | 2/2014 | Cheng et al. |
| 8,658,295 B2 | 2/2014 | Cheng et al. |
| 8,679,680 B2 | 3/2014 | Vanimisetti et al. |
| 8,753,543 B2 | 6/2014 | Zhamu et al. |
| 8,828,481 B2 | 9/2014 | Burton et al. |
| 8,835,056 B2 | 9/2014 | Xiao et al. |
| 8,974,946 B2 | 3/2015 | Cai et al. |
| 8,999,584 B2 | 4/2015 | Jiang et al. |
| 9,012,075 B2 | 4/2015 | Verbrugge et al. |
| 9,034,519 B2 | 5/2015 | Xiao et al. |
| 9,059,451 B2 | 6/2015 | Xiao et al. |
| 9,093,705 B2 | 7/2015 | Xiao et al. |
| 9,123,939 B2 | 9/2015 | Xiao et al. |
| 9,143,830 B2 | 9/2015 | Sakai et al. |
| 9,153,819 B2 | 10/2015 | Huang et al. |
| 9,160,036 B2 | 10/2015 | Yang et al. |
| 9,356,281 B2 | 5/2016 | Verbrugge et al. |
| 9,362,551 B2 | 6/2016 | Sachdev et al. |
| 9,362,552 B2 | 6/2016 | Sohn et al. |
| 9,379,374 B2 | 6/2016 | Liu et al. |
| 9,947,915 B2 | 4/2018 | Kim et al. |
| 2002/0075627 A1* | 6/2002 | Shinozaki .............. H01G 9/155 361/302 |
| 2002/0086942 A1* | 7/2002 | Fujita ...................... C08F 8/42 525/100 |
| 2003/0158332 A1* | 8/2003 | Lassman ................ B05D 7/572 524/832 |
| 2006/0147797 A1 | 7/2006 | Wu et al. |
| 2007/0087178 A1 | 4/2007 | Hendriks et al. |
| 2007/0099081 A1 | 5/2007 | Matsuda et al. |
| 2007/0202411 A1 | 8/2007 | Kim et al. |
| 2007/0238023 A1 | 10/2007 | Gorshkov et al. |
| 2007/0275302 A1 | 11/2007 | Sotowa et al. |
| 2008/0063939 A1 | 3/2008 | Ryu et al. |
| 2008/0226987 A1 | 9/2008 | Yumoto et al. |
| 2008/0261116 A1 | 10/2008 | Burton et al. |
| 2009/0111031 A1 | 4/2009 | Hirose et al. |
| 2009/0136415 A1 | 5/2009 | Gorshkov et al. |
| 2009/0140742 A1 | 6/2009 | Koch et al. |
| 2009/0155697 A1 | 6/2009 | Park et al. |
| 2009/0233171 A1 | 9/2009 | Naruse |
| 2009/0253042 A1 | 10/2009 | Sun et al. |
| 2009/0286157 A1 | 11/2009 | Chen et al. |
| 2009/0325069 A1* | 12/2009 | Anada .................. C09J 123/147 429/217 |
| 2009/0325071 A1 | 12/2009 | Verbrugge et al. |
| 2010/0079145 A1 | 4/2010 | Meisner et al. |
| 2010/0133482 A1 | 6/2010 | Abusleme et al. |
| 2010/0143790 A1 | 6/2010 | Inagaki et al. |
| 2010/0203392 A1 | 8/2010 | Yamada et al. |
| 2010/0272612 A1 | 10/2010 | Ramamurthy |
| 2010/0330421 A1 | 12/2010 | Cui et al. |
| 2011/0017528 A1 | 1/2011 | Kumar et al. |
| 2011/0027649 A1 | 2/2011 | Abe |
| 2011/0037436 A1 | 2/2011 | Seethaler et al. |
| 2011/0044886 A1 | 2/2011 | Gorshkov et al. |
| 2011/0062379 A1 | 3/2011 | Miyawaki et al. |
| 2011/0086249 A1 | 4/2011 | Timmons |
| 2011/0086294 A1 | 4/2011 | Xiao et al. |
| 2011/0111294 A1 | 5/2011 | Lopez et al. |
| 2011/0111308 A1 | 5/2011 | Halalay et al. |
| 2011/0121225 A1 | 5/2011 | Posudievsky et al. |
| 2011/0151333 A1 | 6/2011 | Halalay et al. |
| 2011/0165459 A1 | 7/2011 | Halalay et al. |
| 2011/0166811 A1 | 7/2011 | Koch et al. |
| 2011/0189577 A1 | 8/2011 | Chung et al. |
| 2011/0200781 A1 | 8/2011 | Sowul et al. |
| 2011/0200863 A1 | 8/2011 | Xiao et al. |
| 2011/0224928 A1 | 9/2011 | Lin et al. |
| 2011/0250478 A1 | 10/2011 | Timmons et al. |
| 2011/0274962 A1 | 11/2011 | Inagaki et al. |
| 2012/0003533 A1 | 1/2012 | Dahn et al. |
| 2012/0086457 A1 | 4/2012 | Meisner et al. |
| 2012/0100403 A1 | 4/2012 | Wang et al. |
| 2012/0101674 A1 | 4/2012 | Wang et al. |
| 2012/0105068 A1 | 5/2012 | Wang et al. |
| 2012/0105069 A1 | 5/2012 | Wang et al. |
| 2012/0109503 A1 | 5/2012 | Yang et al. |
| 2012/0156568 A1 | 6/2012 | Kia et al. |
| 2012/0156569 A1 | 6/2012 | Kia et al. |
| 2012/0161757 A1 | 6/2012 | Koch et al. |
| 2012/0161776 A1 | 6/2012 | Koch et al. |
| 2012/0169297 A1 | 7/2012 | Schaefer et al. |
| 2012/0208087 A1 | 8/2012 | Yamamoto et al. |
| 2012/0219852 A1 | 8/2012 | Huang et al. |
| 2012/0227252 A1 | 9/2012 | Nazr |
| 2012/0229096 A1 | 9/2012 | Nazr |
| 2012/0231321 A1 | 9/2012 | Huang et al. |
| 2012/0244390 A1 | 9/2012 | Cheng et al. |
| 2012/0244418 A1 | 9/2012 | Cheng et al. |
| 2012/0264017 A1 | 10/2012 | Nazri et al. |
| 2012/0270103 A1 | 10/2012 | Lee et al. |
| 2012/0301790 A1 | 11/2012 | Xiao et al. |
| 2012/0308853 A1 | 12/2012 | Vanimisetti et al. |
| 2012/0308872 A1 | 12/2012 | Huang |
| 2012/0328927 A1 | 12/2012 | Timmons et al. |
| 2013/0071736 A1 | 3/2013 | Xiao et al. |
| 2013/0071742 A1 | 3/2013 | Halalay et al. |
| 2013/0099159 A1 | 4/2013 | Halalay et al. |
| 2013/0122374 A1 | 5/2013 | Verbrugge et al. |
| 2013/0131200 A1 | 5/2013 | Huang |
| 2013/0157125 A1 | 6/2013 | Sachdev et al. |
| 2013/0175998 A1 | 7/2013 | Wang et al. |
| 2013/0177804 A1 | 7/2013 | Verbrugge et al. |
| 2013/0177808 A1 | 7/2013 | Wang et al. |
| 2013/0183582 A1 | 7/2013 | Halalay et al. |
| 2013/0189576 A1 | 7/2013 | Verbrugge et al. |
| 2013/0224602 A1 | 8/2013 | Huang |
| 2013/0234674 A1 | 9/2013 | Nazri |
| 2013/0284338 A1 | 10/2013 | Xiao et al. |
| 2013/0316231 A1* | 11/2013 | Iijima ...................... C09D 5/14 429/211 |
| 2013/0319599 A1 | 12/2013 | Huang |
| 2013/0323595 A1 | 12/2013 | Sohn et al. |
| 2014/0011089 A1 | 1/2014 | Yamada et al. |

(56) References Cited

U.S. PATENT DOCUMENTS

| | | |
|---|---|---|
| 2014/0023931 A1 | 1/2014 | Huang |
| 2014/0038024 A1 | 2/2014 | Huang |
| 2014/0113197 A1 | 4/2014 | Xiao et al. |
| 2014/0205905 A1 | 7/2014 | Xiao et al. |
| 2014/0265557 A1 | 9/2014 | Huang et al. |
| 2014/0272526 A1 | 9/2014 | Huang |
| 2014/0272558 A1 | 9/2014 | Xiao et al. |
| 2014/0272569 A1 | 9/2014 | Cai et al. |
| 2014/0272573 A1 | 9/2014 | Xiao et al. |
| 2014/0272578 A1 | 9/2014 | Xiao et al. |
| 2014/0272584 A1 | 9/2014 | Jiang et al. |
| 2014/0272603 A1 | 9/2014 | Yang et al. |
| 2015/0010817 A1 | 1/2015 | Cui et al. |
| 2015/0014890 A1 | 1/2015 | Xiao |
| 2015/0037651 A1 | 2/2015 | Huang |
| 2015/0125760 A1 | 5/2015 | Smith et al. |
| 2015/0162602 A1 | 6/2015 | Dadheech et al. |
| 2015/0180023 A1 | 6/2015 | Xiao et al. |
| 2015/0191570 A1 | 7/2015 | Garcia Perez et al. |
| 2015/0228980 A1* | 8/2015 | Huang ............... H01M 4/0404 429/213 |
| 2015/0357079 A1* | 12/2015 | Daughenbaugh ........ C09D 7/61 205/122 |
| 2017/0110733 A1* | 4/2017 | Yoon ........................ C09D 5/24 |
| 2017/0317387 A1 | 11/2017 | Inoue et al. |
| 2018/0287146 A1* | 10/2018 | Suzuki ............... H01M 10/052 |
| 2020/0136146 A1* | 4/2020 | Hellring ............... H01M 4/625 |

FOREIGN PATENT DOCUMENTS

| | | |
|---|---|---|
| CN | 101764209 A | 3/2010 |
| CN | 101728517 A | 6/2010 |
| CN | 101986442 A | 3/2011 |
| CN | 102306748 A | 1/2012 |
| CN | 103779550 A | 5/2014 |
| CN | 103943819 A | 7/2014 |
| CN | 104701487 A | 6/2015 |
| DE | 102013220351 A1 | 4/2014 |
| DE | 102014118089 A1 | 6/2015 |
| FR | 2965408 A1 | 3/2012 |
| JP | 2008062727 A1 | 3/2010 |
| JP | 2010093027 A | 4/2010 |
| JP | 5370289 B2 | 1/2012 |
| KR | 2016/006945 * | 1/2016 |
| WO | 2007094635 A1 | 8/2007 |
| WO | 2012132396 A1 | 10/2012 |
| WO | 2011078263 A1 | 5/2013 |
| WO | 2014022986 A1 | 2/2014 |
| WO | 2014182281 A1 | 11/2014 |
| WO | 2015176241 A1 | 11/2015 |

OTHER PUBLICATIONS

Bai, Ying, et al., "Microstructure and electrochemical performances of LiF-coated spinel LiMn2O4," Transactions of Nonferrous Metals Society of China, vol. 17, rm. s892-s896 (2007).

Gaines, Linda, et al., "Costs of Lithium-Ion Batteries for Vehicles," Argonne National Laboratory, Center for Transportation Research (May 2000).

Lee, Won-Jun, et al., "A Comparative Study on the Si Precursors for the Atomic Layer Deposition of Silicon Nitride Thin Films," Journal of the Korean Physical Society, vol. 45, No. 5, pp. 1352-1355 (Nov. 2004).

Qin, Yan, et al., "Mechanism of L TO Gassing and potential solutions," Argonne National Laboratory Presentation, May 9-13, 2011 (18 pages).

Aurbach, Doran, et al., "Design of electrolyte solutions for Li and Li-ion batteries: a review," Electrochimica Acta, vol. 50, pp. 247-254 (2004)(published online Aug. 3, 2004).

George, Steven M., "Atomic Layer Deposition: An Overview," Chem. Rev., vol. 110, No. 1, pp. 111-131 (2010) (published on line Nov. 30, 2009).

Goldstein, David N., et al., "Al2O3 Atomic Layer Deposition with Trimethylaluminum and Ozone Studied by in Situ Transmission FTIR Spectroscopy and Quadrupole Mass Spectrometry," J. Phys. Chem. C, vol. 112, No. 49, pp. 19530-19539 (2008) (published online Nov. 13, 2008).

Leskela, Markku, et al., "Atomic layer deposition (ALO): from precursors to thin film structures," Thin Solid Films, vol. 409, pp. 138-146 (2002).

Nikkei Electronics, "New Anode Material Could Boost Lithium Battery Performance by 30 Percent," available at http://www.greentechmedia.com/articles/read/new-anode-material-could-boost-lithium-battery-performance-by-30-percent (Nov. 2, 2010) (2pages).

Ramadass, Premanand, et al., "Mathematical Modeling of SEI Formation in Li-Ion Cell Anodes," 202nd Meeting of The Electrochemical Society-Salt Lake City, UT, Oct. 20-25, 2002, (Abstract) (10 pages) (Oct. 23, 2002).

Vetter, J., et al., "Ageing mechanisms in lithium-ion batteries," J. Power Sources, vol. 147, Nos. 1-2, pp. 269-281 (Sep. 9, 2005).

Huntsman Corporation, Jeffamine.RTM. ED-2003 Polyetheramine Technical Bulletin, Form 5197-0208 (2007) (2 pages).

Franssila, Sami, Introduction to Microfabrication, Second Ed., p. 53 (2010).

A Second Office Action in Chinese Application No. 201310489603.8 from the State Intellectual Property Office (SIPO) dated May 22, 2016, and correspondence from China Patent Agent (H.K.) summarizing the Second Office Action; 11 pages.

A First Office Action in Chinese Application No. 201310489603.8 from the State Intellectual Property Office (SIPO) dated Jul. 31, 2015, and correspondence from China Patent Agent (H.K.) summarizing the First Office Action; 12 pages.

A First Office Action in Chinese App. No. 201410017174.9 from the State Intellectual Property Office dated Oct. 10, 2015; 12 pages.

A First Office Action in Chinese Application No. 201410750591.4 from the Chinese Patent Office dated Jul. 5, 2016 and correspondence from China Patent Agent (H.K.) summarizing the First Office Action; 9 pages.

Xingcheng Xiao et al.; "Ultrathin Multifunctional Oxide Coatings for Lithium Ion Batteries"; D Advanced Materials, vol. 23, No. 34; Jul. 22, 2011; pp. 3911-3915.

Yoon Seok Jung et al.; "Ultrathin Direct Atomic Layer Deposition on Composite Electrodes for Highly Durable and Safe Li-Ion Batteries"; Advanced Materials, vol. 22, No. 19; Apr. 6, 2010; pp. 2172-2176.

A second Office Action in Chinese Application No. 201410017174.9 from the Chinese Patent Office dated Aug. 3, 2016 and correspondence from China Patent Agent (H.K) summarizing the First Office Action; 15 pages.

U.S. Appl. No. 16/034,067, filed Jul. 12, 2018.

* cited by examiner

HIGH-PERFORMANCE ELECTRODES WITH A POLYMER NETWORK HAVING ELECTROACTIVE MATERIALS CHEMICALLY ATTACHED THERETO

INTRODUCTION

The present disclosure relates to high-performance electrodes for lithium-ion electrochemical devices, and more particularly to chemically attaching electroactive materials to a chemically crosslinked polymer for optimizing electrode performance in lithium-ion electrochemical devices.

High-energy density electrochemical cells, such as lithium-ion batteries may be used in a variety of consumer products, such as mobile devices including laptops, tablets, and cellular telephones, and vehicles, such as Hybrid Electric Vehicles (HEVs) and Electric Vehicles (EVs), and the like.

High-performance electrodes for electrochemical cells suffer from significant drawbacks. For example, electrodes with silicon-containing electroactive materials experience a large amount of Coulombic fade during charge-discharge cycles. Volume changes during charge-discharge cycles may limit performance and/or lifetime of the battery.

SUMMARY

While not being bound by theory, diminished performance and/or lifetime of the battery is believed to be generally due to the breakdown in physical contact of the conductive fillers and binder with the electroactive material and current collectors caused by the volume changes that the electroactive particles undergo during charge-discharge cycles.

Systems and methods in accordance with the present disclosure provide optimized performance and/or lifetime of the battery through the use of a binder with an electroactive material chemically attached to a chemically crosslinked polymer matrix. Beneficially, the binder with the electroactive material chemically attached to the chemically crosslinked polymer matrix optimizes the mechanical robustness of the electrode and enhances interfacial adhesion between the binder and the electroactive material. Moreover, as described herein, the simultaneous formation of both the chemically crosslinked matrix and the chemical attachment to the electroactive material optimizes processing and formation of the electrode, as well as mechanical and electrical properties.

According to aspects of the present disclosure, a method includes mixing an electrode slurry and forming a polymer network within the electrode slurry. The electrode slurry includes an electroactive material, an electrically conductive filler, a plurality of polymer chains, and a plurality of chemical crosslinking precursors. Each chemically crosslinking precursor is configured to (i) chemically crosslinking the plurality of polymer chains and (ii) chemically attaching the electroactive material to the plurality of polymer chains.

According to further aspects of the present disclosure, the method further includes applying the electrode slurry having the polymer network suspended therein to a current collector and drying the electrode slurry to thereby form the electrode.

According to further aspects of the present disclosure, the method further includes grafting the plurality of chemical crosslinking precursors to the plurality of polymer chains. The grafting includes mixing the plurality of chemical crosslinking precursors with the plurality of polymer chains to thereby form a grafting solution and resting the grafting solution for at least about ten minutes prior to forming the polymer network such that substantially all of the plurality of chemical crosslinking precursors is grafted to the plurality of polymer chains.

According to aspects of the present disclosure, an electrode includes a polymer network and an electrically conductive filler dispersed within the polymer network. The polymer network includes a plurality of polymer chains having an electroactive material chemically attached thereto. Each of the plurality of polymer chains is chemically crosslinked to another of the plurality of polymer chains. The electroactive material is a material that undergoes a volume change during charging and discharging of a battery cell. The polymer network is formed by mixing an electrode slurry and forming a polymer network. The electrode slurry includes an electroactive material, an electrically conductive filler, a plurality of polymer chains, and a plurality of chemical crosslinking precursors. The plurality of chemical crosslinking precursors is configured to (i) chemically crosslink the plurality of polymer chains and (ii) chemically attach the electroactive material to the plurality of polymer chains. The electrically conductive filler is configured to carry electrical energy from the electroactive material.

According to aspects of the present disclosure, a binder for a battery cell includes a polymer network. The polymer network includes a plurality of polymer chains having an electroactive material chemically attached thereto. Each of the plurality of polymer chains being chemically crosslinked to another of the plurality of polymer chains. The electroactive material being a material that undergoes a volume change during charging and discharging of a battery cell. The polymer network is formed by mixing an electrode slurry and forming a polymer network within the electrode slurry. The electrode slurry includes an electroactive material, an electrically conductive filler, a plurality of polymer chains, and a plurality of chemical crosslinking precursors. The plurality of chemically crosslinking precursors configured to (i) chemically crosslink the plurality of polymer chains and (ii) chemically attach the electroactive material to the plurality of polymer chains.

According to further aspects of the present disclosure, the chemical crosslinking precursor is selected from the group consisting of an isocyanate-silane, an epoxide-silane, and a polyisocyanate.

According to further aspects of the present disclosure, chemically attaching the electroactive material to the plurality of chemical crosslinking precursors includes forming a hydroxyl group on the electroactive material and reacting the hydroxyl group with one of the plurality of chemical crosslinking precursors.

According to further aspects of the present disclosure, the polymer network includes a particle of the electroactive material chemically attached to both a first grafted precursor on a first of the plurality of polymer chains and a second grafted precursor on a second of the plurality of polymer chains.

According to further aspects of the present disclosure, forming the polymer network includes simultaneously (i) chemically crosslink the plurality of polymer chains and (ii) chemically attach the electroactive material to the plurality of polymer chains.

According to further aspects of the present disclosure, the plurality of chemical crosslinking precursors are derived from 3-(triethoxysilyl)propyl isocyanate.

According to further aspects of the present disclosure, the plurality of polymer chains includes a backbone of polyacrylic acid, carboxymethyl cellulose, or alginic acid.

According to further aspects of the present disclosure, the electrode slurry, on a basis of weight of solids, includes the electroactive material in an amount between about 30% by weight and about 80% by weight; the electrically conductive filler in an amount between about 10% by weight and about 50% by weight; and the plurality of polymer chains in an amount between about 5% by weight and about 40% by weight.

The above features and advantages and other features and advantages of the present disclosure are apparent from the following detailed description of the best modes for carrying out the disclosure when taken in connection with the accompanying drawings.

BRIEF DESCRIPTION OF THE DRAWINGS

The drawings are illustrative and not intended to limit the subject matter defined by the claims. Exemplary aspects are discussed in the following detailed description and shown in the accompanying drawings in which:

DETAILED DESCRIPTION

The present disclosure pertains to electrochemical cells, and more particularly to high-performance lithium-ion electrochemical cells (e.g., lithium-ion batteries) having optimized electrodes.

Certain electroactive materials used to form the electrode, such as silicon, silicon oxides, and silicon alloys, may provide a high specific capacity, but undergo large volume changes during charge-discharge cycles. For example, silicon-containing electroactive materials are believed to expand volume by 300% or more during standard charge-discharge cycles. While not being bound by theory, it is believed that reduced performance of battery cells using these electrodes (e.g., Coulombic fade) occurs due to the large volume changes encountered during the charge-discharge cycle. Moreover, each charge-discharge cycle undergone by these electrodes generally reduces the Coulombic charge capacity of the electrode. While not being bound by theory, it is believed that the breakdown of physical contact between the electroactive material and other components of the electrode (e.g., electrically conductive filler and binder) during the expansion and contraction of the electroactive material contributes to the Coulombic fade. In addition to Coulombic fade and reduced performance, the large volume changes of high-performance electroactive materials may result in a limited operable lifetime by drying the electrolyte and cracking the electrode assembly.

For example, it is believed that binders in accordance with the present disclosure resist binder creep within the electrode. Further, it is believed that binders in accordance with the present disclosure allow for continued contact between the binder and the electrically conductive filler with the electroactive material during expansion and contraction of the electroactive material.

Figure 1:
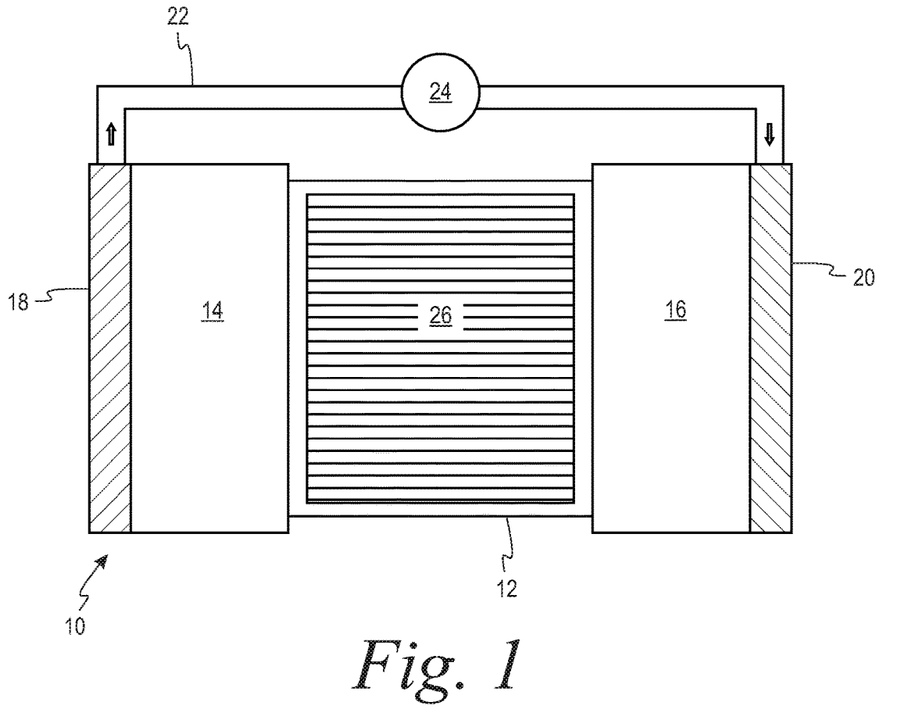
FIG. 1 illustrates a schematic view of an exemplary electrochemical battery cell including a binder forming a polymer network including an electroactive material chemically attached to a chemically crosslinked polymer matrix, according to aspects of the present disclosure.

Referring now to FIG. 1, a battery cell 10 is shown according to aspects of the present disclosure. The battery cell 10 includes a separator 12 disposed between a first electrode 14 and a second electrode 16. The separator 12 allows ionic transfer and inhibits electronic transfer therethrough.

The first electrode 14 is configured to intercalate ions while the battery cell 10 is charging and de-intercalate ions while the battery cell 10 is discharging. As will be explained further below with respect to FIG. 2, the first electrode 14 includes a first electroactive material 202, and an electrically conductive filler 204, and a binder 206.

The first electrode 14 is disposed on a first current collector 18. The first current collector 18 is configured to collect and move free electrons between the first electrode 14 and the second electrode 16 via an external circuit 22. The external circuit 22 may include an external device 24 which may be a load that consumes electric power from the battery cell 10 and/or a power source that provides electric power to the battery cell 10.

The second electrode 16 is configured to intercalate the ions received from the first electrode 14 when the battery cell 10 is discharging and de-intercalate the ions for transport to the first electrode 14 while the battery cell 10 is charging. The second electrode 16 includes a second electroactive material (not illustrated) and is disposed on a second current collector 20. The second electroactive material is formed from materials cooperative with the first electroactive material 202 to facilitate ion flow and electron flow between the first electrode 14 and the second electrode 16.

The second current collector 20 is configured to collect and move free electrons between the first electrode 14 and the second electrode 16 via the external circuit 22. The second electrode 16 may also include a binder (not shown). In some aspects, the binder of the second electrode is the binder 206.

Each of the first electrode 14, the second electrode 16, and the separator 12 may further include an electrolyte 26. The electrolyte 26 is configured to promote movement of ions between the first electrode 14 and the second electrode 16 during charging and discharging of the lithium-ion cell 10. The electrolyte may be liquid, solid, or gel electrolyte.

Figure 2:
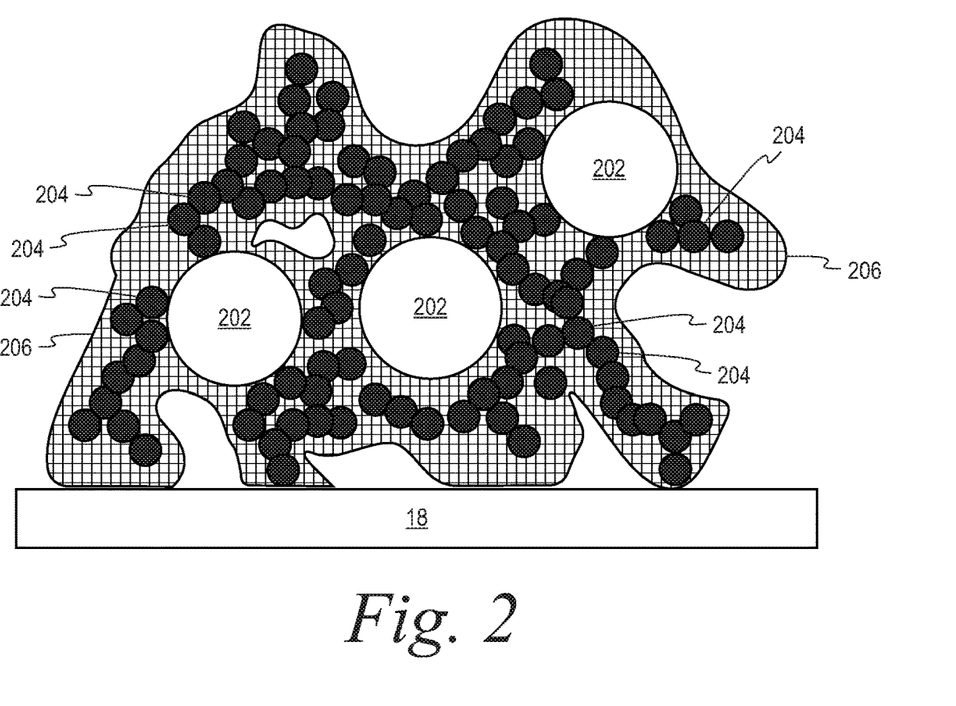
FIG. 2 illustrates a schematic view of an electrode of FIG. 1.

FIG. 2 is a schematic view of the first electrode 14 including the first electroactive material 202, the electrically conductive filler 204, and the binder 206 disposed on the first current collector 18. The binder 206 suspends the first electroactive material 202 and the electrically conductive filler 204.

The first electroactive material 202 is configured to receive and intercalate the ions during charging of the battery cell 10. The first electroactive material 202 is further configured to de-intercalate and release the ions during discharging of the battery cell 10. In some aspects, the ions are lithium ions, and the first electroactive material 202 includes lithium-graphite intercalation compounds, lithium-silicon intercalation compounds, lithium-tin intercalation compounds, lithium alloys, combinations thereof, and the like.

As used herein, an electroactive material, such as the first electroactive material 202, is material which experiences large volume changes of at least 50% during the charge-discharge cycles that are carried out within design parameters for the battery cell 10. In some aspects, the first electroactive material 202 includes silicon, silicon oxides, and/or silicon alloys. Beneficially, silicon-containing electroactive materials provide among the highest theoretical charge capacities for lithium-ion batteries, particularly in comparison to graphite.

The electrically conductive filler 204 is configured to carry charge between the first electroactive material 202 and the first current collector 18. The electrically conductive filler 204 is dispersed within the first electrode 14 in a concentration at or above the percolation threshold. The electrically conductive filler 204 may be a suitable material such as a carbon-containing material. In some aspects, the electrically conductive filler 204 is selected from the group of carbon black, carbon fiber, graphite, combinations thereof, and the like.

Figure 3:
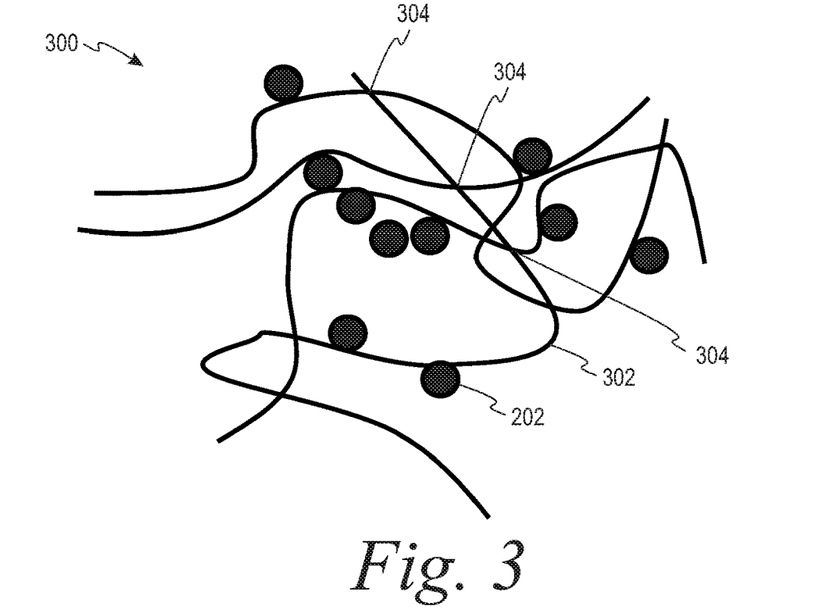
FIG. 3 illustrates a schematic view of the polymer network, according to aspects of the present disclosure.

FIG. 3 is a schematic view of a polymer network 300 of the binder 206. The polymer network 300 includes a plurality of polymer chains 302 that are chemically crosslinked at crosslinking points 304. The electroactive material 202 is chemically attached to the plurality of polymer chains 302. In some aspects, particles of the electroactive material 202 are chemically attached to multiple polymer chains 302 such that crosslinking points 304 include the electroactive material 202 therein.

Figure 4:
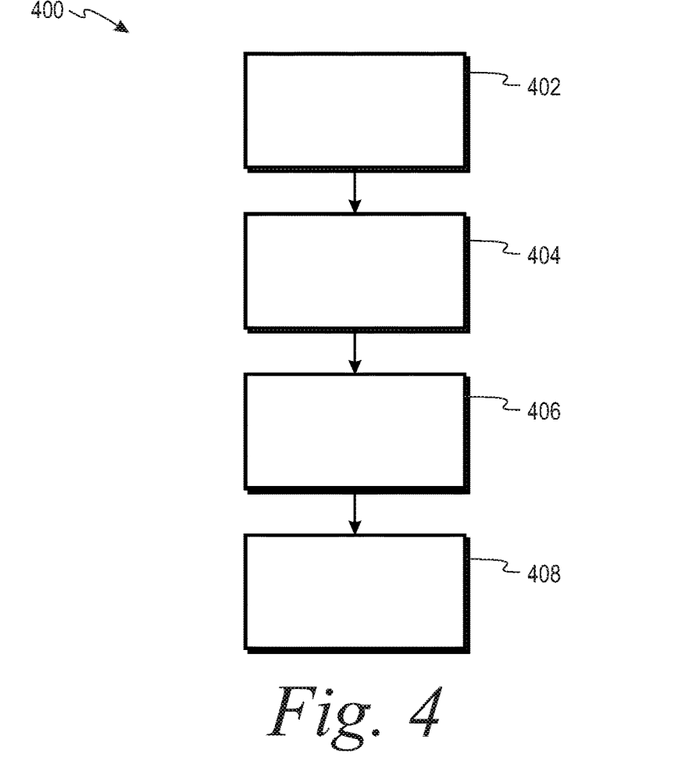
FIG. 4 illustrates a method of forming the electrode, according to aspects of the present disclosure.

FIG. 4 illustrates a method 400 of forming an electrode, such as the first electrode 14. The method 400 includes mixing 402 an electrode slurry, forming 404 the polymer network 300 within the electrode slurry, applying 406 the electrode slurry containing the polymer network 300 to a current collector, and drying 408 the electrode slurry to thereby form the electrode. The electrode slurry may be dried via a dryer to form the dry electrode.

The electrode slurry includes the electroactive material 202, the electrically conductive filler 204, the plurality of polymer chains 302, and a chemical crosslinking precursor in a solvent. In some aspects, the electrode slurry includes, on a basis of solids weight, the electroactive material in an amount between about 30% by weight and about 80% by weight, the electrically conductive filler in an amount between about 10% by weight and about 50% by weight, and the plurality of polymer chains in an amount between about 5% by weight and about 40% by weight.

The chemical crosslinking precursors can be a suitable compound configured to chemically attach to the electroactive material 202, chemically attach to the polymer chains 302, and form chemical crosslinks. For example, the chemical crosslinking precursors may include two or more functional groups such as an isocyanate, a silane, an epoxide, an ether, and the like. Further, the functional groups may be protected or unprotected.

In some aspects, the chemical crosslinking precursor includes a first functional group and a second functional group that are the same functional group. For example, the chemical crosslinking precursors may be a polyisocyanate such as a diisocyanate or a triisocyanate. In some aspects, the chemical crosslinking precursor is attached to the electroactive material 202 prior to mixture with the plurality of polymer chains 302. For example, the polyisocyanate may be mixed with the electroactive material 202 such that a first of the isocyanate functional groups reacts with a surface of a respective particle of the electroactive material 202 to attach the chemical crosslinking precursor thereto while the remaining functional groups remain substantially unreacted. The remaining functional groups are then available for attaching to the polymer chains 302 and/or chemically crosslinking the polymer chains 302 when the electroactive material 202 having the chemical crosslinking precursors attached thereto and polymer chains 302 are mixed. Forming 404 the polymer network may then occur by resting a predetermined time under the given conditions. Forming 404 the polymer network 300 may also include adding additional chemical crosslinking precursors to this mixture to achieve a desired amount of chemical crosslinking. The additional chemical crosslinking precursors may be the same as or different from the initial chemical crosslinking precursors.

In some aspects, the chemical crosslinking precursor includes a first functional group and a second functional group that are the different functional groups. For example, the first functional group may be selected to quickly react with desired components of the mixture while the second functional group is selected to slowly react or not react with components of the mixture under the given conditions. In some examples, the first functional group is configured to quickly react with functional groups on the polymer backbone and the second functional group is configured to slowly react or not react with the polymer backbone, electroactive material 202, or the chemical crosslinking precursor under the given conditions. In some examples, the chemical crosslinking precursor includes a first functional group that is configured to quickly react with functional groups on the polymer backbone and/or the electroactive material 202 and a second functional group that is configured to slowly react or not react with the polymer backbone, electroactive material 202, or the chemical crosslinking precursor under the given conditions. In some aspects, the chemical crosslinking precursors are an isocyanate-silane compound. In some aspects, the chemical crosslinking precursors are an isocyanate-epoxide compound. In some aspects, the chemical crosslinking precursors are an epoxide-silane compound.

Beneficially, the chemical crosslinking precursor including the different functional groups may be reacted with the electroactive material 202 prior to mixture with the polymer chains 302, may be reacted with the polymer chains 302 prior to mixture with the electroactive material 202, or may be added to a mixture of both the electroactive material 202 and the polymer chains 302 to react with one or both of the components. This provides for simultaneously crosslinking the polymer chains 302 and attaching the electroactive material 202 to the polymer network 300.

Forming 404 the polymer network may then occur by reacting the second functional group to chemically crosslink the polymer chains 302, and if needed chemically attach to the electroactive material 202. The reaction of the second functional group may begin contemporaneously with the reaction of the first functional group or may be initiated at some point after the reaction of the first functional group. For example, the mixture may be rested for a longer period of time than is required for reaction of the first functional group, the reaction may be initiated or accelerated by an input of energy or compound to the mixture, combinations thereof, and the like.

The polymer chains 302 include a polymer backbone having a plurality of functional groups thereon that are configured to react with the respective functional group of the chemical crosslinking precursor (e.g., isocyanate or epoxide of the chemical crosslinking precursor). In some aspects, the functional groups of the polymer chains 302 are hydroxyls. In some aspects, the functional groups of the polymer chains 302 are carboxylic acids. For example, the backbone of the polymer chain 302 may be polyacrylic acid, carboxymethyl cellulose, or alginic acid.

In some examples, the chemical crosslinking precursor is a silane. The first functional group of the chemical crosslinking precursor grafts the chemical crosslinking precursor to the polymer chains 302 via a carbonyl group. The second functional group on the grafted chemical crosslinking precursors may be one or more ether groups extending from the silicon atom.

Grafting the chemical crosslinking precursors to the polymer chains 302 may include mixing isocyanate-silane or epoxide-isocyanate crosslinkers with a polymer solution to thereby form a grafting solution and resting the grafting solution until substantially all of the silane crosslinkers are grafted onto the polymer chains 302. For example, the polymer solution may be a solution of polyacrylic acid in n-methyl-2-pyrrolidone, and the silane crosslinker may be 3-(triethoxysilyl)propyl isocyanate and (3-glycidyloxypropyl) trimethoxysilane. The silane crosslinkers are added in an amount to achieve a desired average density of crosslinking points. For example, the silane crosslinkers may be added. During the resting period, the isocyanate or epoxide group reacts with the carboxylic acid to graft silane crosslinkers to the polyacrylic acid backbone via a carbonyl in the form of an amide, urethane, or ester. The grafting solution may be rested for a minimum of about 2 min prior to forming the polymer network such that substantially all of the silane crosslinkers are grafted to the plurality of polymer chains.

An initiator or an accelerator may be added to the electrode slurry that facilitates simultaneously (i) attaching the electroactive material to the chemical crosslinking precursors and (ii) chemically crosslinking the plurality of polymer chains. For example, if the electroactive material includes silicon, the initiator may be water or an alcohol. Silicon in the presence of water or alcohol will form silicic acids, e.g., $Si(OH)_4$, which is chemically reactive with the selected functional groups, e.g., ether groups, of the silane crosslinker. The reaction between the silicic acid and an ether of the silane crosslinker will chemically attach the electroactive material to the polymer chain via a siloxane bond. Further, water or alcohol facilitates the chemical crosslinking of the plurality of polymer chains by forming siloxane bonds. The electrode slurry may be rested to allow formation of the polymer network 300 prior to applying 406 the electrode slurry to the current collector. In some aspects, the electrode slurry is rested for at least about one hour.

Drying 408 the electrode slurry may occur via a dryer to form the dry electrode. The drying 408 removes the solvent in the slurry may be carried out at elevated temperatures and may be carried out at atmospheric pressure or under vacuum. In some aspects, the electrode slurry is dried at about 50° C. In some aspects, the electrode slurry is dried at about 50° C. under a vacuum. In some aspects, the electrode slurry is dried at about 120° C. under dry vacuum. In some aspects, the electrode slurry is dried in multiple steps, such as with two or more of these temperatures and pressures applied successively. For example, the drying 408 may include exposure to about 50° C. at atmospheric pressure, followed by about 50° C. at vacuum pressure, followed by about 100° C. under dry vacuum.

While the best modes for carrying out the disclosure have been described in detail, those familiar with the art to which this disclosure relates will recognize various alternative designs and embodiments for practicing the disclosure within the scope of the appended claims.

A well-mixed dispersion of conductive carbon and a silicon-containing electroactive material in a solvent of n-methyl-2-pyrrolidone is obtained. An electrode slurry is formed by adding polyacrylic acid solution to the well-mixed dispersion, and the electrode slurry is mixed until substantially homogenous (e.g., at least 5 minutes). An isocyanate-silane crosslinker of 3-(triethoxysilyl)propyl isocyanate is added to the electrode slurry, and the electrode slurry is mixed until substantially homogenous (e.g., at least 5 minutes). The solids in the electrode slurry, on a basis of total weight of the electrode solids, includes 60% by weight of the silicon-containing electroactive material, 20% by weight of conductive carbon, 20% by weight of polyacrylic acid, and <1% by weight of the isocyanate-silane crosslinker.

The electrode slurry is then left to rest for about 1 hour to allow grafting of the 3-(triethoxysilyl)propyl isocyanate to the polyacrylic acid. Water is then added to the electrode slurry to facilitate the formation of a polymer network by simultaneously chemically crosslinking the polyacrylic acid backbones and chemically attaching the silicon-containing electroactive material to the polyacrylic acid backbones. The electrode was then formed by casting the electrode slurry onto a current collector and drying the electrode slurry under 50° C. overnight followed by 120° C. under vacuum overnight.

Figure 5:
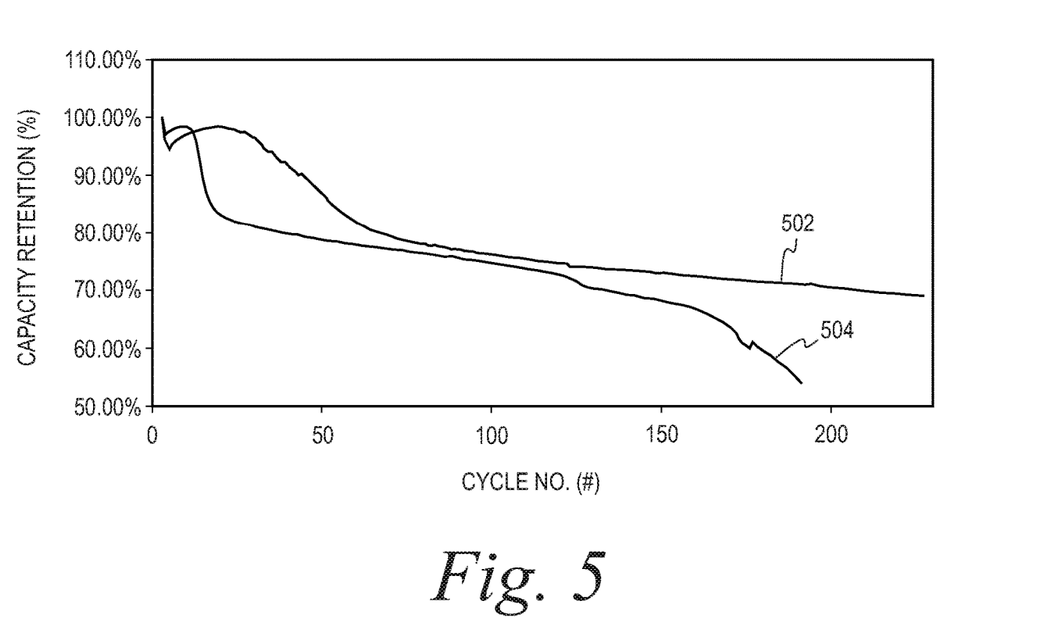
FIG. 5 illustrates a graph of capacity retention versus cycle number comparing two electrodes.

FIG. 5 is a graph comparing capacity retention versus cycle number for two electrodes. The first plot 502 is the capacity retention for an electrode having a polymer network 300 according to aspects of the present disclosure. The second plot 504 is an electrode with a polyacrylic acid binder that is not attached to the electroactive particles. As can be seen, the electrode having the polymer network 300 according to aspects of the present disclosure maintains a higher capacity retention than the unattached binder across all cycles tested. Moreover, at approximately 120 cycles, capacity retention for the electrode with the unattached binder begins to diminish at an accelerated rate while capacity retention for the electrode with the polymer network maintains a more-linear capacity fade.

Figure 6:
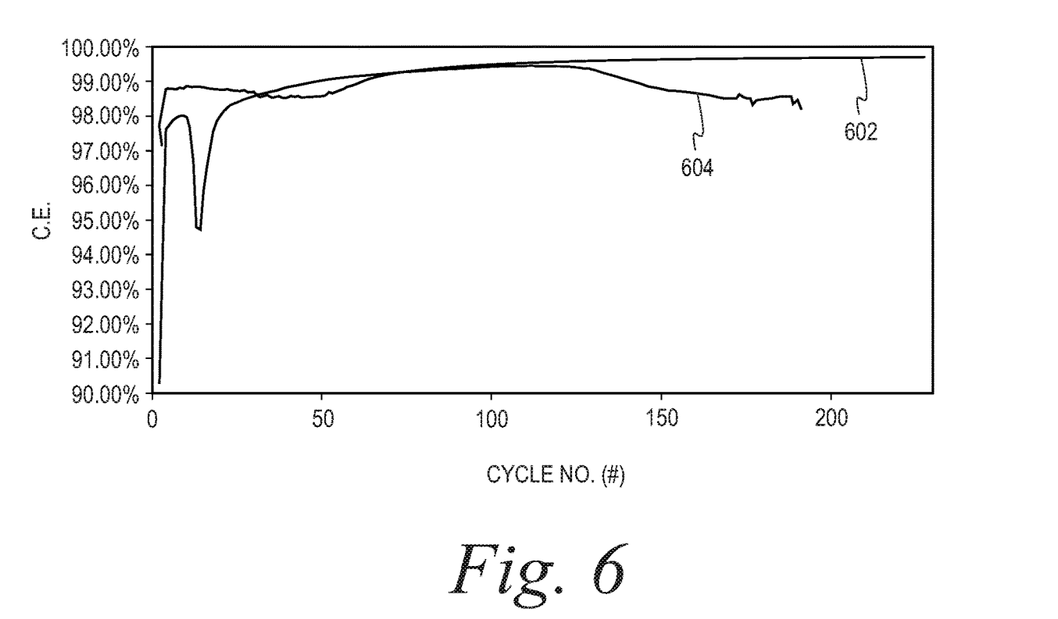
FIG. 6 illustrates a graph of coulombic efficiency versus cycle number comparing two electrodes.

FIG. 6 is a graph comparing Coulombic efficiency versus cycle number for two electrodes. The first plot 604 is the Coulombic efficiency for an electrode having a polymer network 300 according to aspects of the present disclosure. The second plot 602 is an electrode with a polyacrylic acid binder that is not attached to the electroactive particles. As can be seen, the electrode having the polymer network 300 according to aspects of the present disclosure begins with a Coulombic efficiency of approximately 99%, and the Coulombic efficiency, within a margin of measurement error, continues to increase and approach 100% as the number of cycles increases. The electrode with the unattached polyacrylic acid binder begins with a coulombic efficiency of just under 98%, which increases until about 99% at 100 cycles. At about 100 cycles, the Coulombic efficiency of the unattached binder begins to decline, and the trends of the two electrodes diverge.

What is claimed is:

1. A method comprising:
   mixing an electrode slurry including an electroactive material, an electrically conductive filler, a plurality of polyacrylic acid polymer chains, and a plurality of isocyanate chemical crosslinking precursors, each of the isocyanate chemical crosslinking precursors chemically crosslinking the plurality of polyacrylic acid polymer chains and chemically attaching the electroactive material to the plurality of isocyanate chemical crosslinking precursors;
   grafting the plurality of isocyanate chemical crosslinking precursors to the plurality of polyacrylic acid polymer chains, the grafting including:

mixing the plurality of isocyanate chemical crosslinking precursors with the plurality of polyacrylic acid polymer chains to thereby form a grafting solution; and resting the grafting solution for a predefined resting period such that substantially all of the isocyanate chemical crosslinking precursors are grafted to the polyacrylic acid polymer chains; and forming a polymer network within the electrode slurry after resting the grafting solution.

2. The method of claim 1, further comprising:

applying the electrode slurry having the polymer network suspended therein to a current collector; and drying the electrode slurry to thereby form an electrode.

3. The method of claim 1, wherein the predefined resting period is at least about ten minutes.

4. The method of claim 1, wherein the plurality of isocyanate chemical crosslinking precursors is selected from a group consisting of an isocyanate-silane and a polyisocyanate.

5. The method of claim 1, wherein chemically attaching the electroactive material to the plurality of isocyanate chemical crosslinking precursors includes: forming a hydroxyl group on the electroactive material, and reacting the hydroxyl group with one of the plurality of isocyanate chemical crosslinking precursors.

6. The method of claim 1, wherein the polymer network includes a particle of the electroactive material chemically attached to both a first grafted precursor on a first of the plurality of polyacrylic acid polymer chains and a second grafted precursor on a second of the plurality of polyacrylic acid polymer chains.

7. The method of claim 1, wherein forming the polymer network includes simultaneously: (i) chemically crosslinking the plurality of polyacrylic acid polymer chains, and (ii) chemically attaching the electroactive material to the plurality of polyacrylic acid polymer chains.

8. The method of claim 1, wherein the isocyanate chemical crosslinking precursors are derived from 3-(triethoxysilyl)propyl isocyanate.

9. The method of claim 1, wherein the plurality of polyacrylic acid polymer chains includes a polymer backbone of polyacrylic acid with a plurality of functional groups each configured to react with a first isocyanate functional group of the isocyanate chemical crosslinking precursors.

10. The method of claim 1, wherein the electrode slurry, on a basis of weight of solids, includes: the electroactive material in an amount between 30% by weight and 80% by weight; the electrically conductive filler in an amount between 10% by weight and 50% by weight; and the plurality of polyacrylic acid polymer chains in an amount between 5% by weight and 40% by weight.

11. A method of manufacturing an electrode for a lithium-ion electrochemical device, the method comprising:

mixing an electrode slurry including a silicon-containing electroactive material, a carbon-containing electrically conductive filler, a plurality of polyacrylic acid polymer chains, and a plurality of isocyanate chemical crosslinking precursors, each of the isocyanate chemical crosslinking precursors chemically crosslinking the polyacrylic acid polymer chains and chemically attaching the silicon-containing electroactive material to the polyacrylic acid polymer chains;

grafting the isocyanate chemical crosslinking precursors to the polyacrylic acid polymer chains, including:

mixing isocyanate-silane crosslinkers or epoxide-isocyanate crosslinkers with a polymer solution to thereby form a grafting solution, and resting the grafting solution until substantially all of the isocyanate-silane or epoxide-isocyanate crosslinkers are grafted onto the polyacrylic acid polymer chains, forming a polymer network suspended within the electrode slurry after resting the grafting solution;

applying the electrode slurry having the polymer network suspended therein to a current collector; and drying the electrode slurry on the current collector to thereby form the electrode.

12. The method of claim 11, wherein the polymer network includes a particle of the electroactive material chemically attached to both a first grafted precursor on a first polymer chain of the plurality of polyacrylic acid polymer chains and a second grafted precursor on a second polymer chain of the plurality of polyacrylic acid polymer chains.

13. The method of claim 11, wherein forming the polymer network includes simultaneously chemically crosslinking the plurality of polyacrylic acid polymer chains and chemically attaching the electroactive material to the plurality of polyacrylic acid polymer chains.

14. The method of claim 11, wherein the isocyanate chemical crosslinking precursors are derived from 3-(triethoxysilyl)propyl isocyanate.

15. The method of claim 11, wherein the plurality of polyacrylic acid polymer chains includes a polymer backbone of polyacrylic acid with a plurality of functional groups each configured to react with a respective functional group of the isocyanate chemical crosslinking precursors.

16. The method of claim 11, wherein the grafting solution is rested for a minimum of about 2 minutes.

17. The method of claim 11, wherein the isocyanate chemical crosslinking precursors chemically attach particles of the electroactive material such that crosslinking points between the polyacrylic acid polymer chains include therein the electroactive material.

18. The method of claim 11, wherein the electrode slurry includes the electroactive material in an amount between 30% and 80% by weight, the electrically conductive filler in an amount between 10% and 50% by weight, and the polyacrylic acid polymer chains in an amount between 5% and 40% by weight.

19. The method of claim 11, wherein the isocyanate chemical crosslinking precursor includes an isocyanate-silane and a polyisocyanate.

20. The method of claim 11, wherein the plurality of isocyanate chemical crosslinking precursors includes multiple isocyanate functional groups including a first functional group and a second functional group distinct from the first functional group, the first functional group being configured to react with functional groups on a polymer backbone of the polyacrylic acid polymer chains and/or the electroactive material.

* * * * *